United States Patent [19]
Sullivan

[11] Patent Number: 5,481,960
[45] Date of Patent: Jan. 9, 1996

[54] INFUSION TUBE FOR WINE BARRELS

[76] Inventor: Stephen T. Sullivan, P.O. Box 1693, Sausalito, Calif. 94966

[21] Appl. No.: 346,466
[22] Filed: Nov. 29, 1994
[51] Int. Cl.⁶ ..................................................... G12H 1/22
[52] U.S. Cl. ........................... 99/277.1; 99/323; 426/112; 426/114; 426/422; 426/592
[58] Field of Search ........................... 99/275, 276, 277, 99/277.1, 277.2, 278, 279, 323, 323.1; 426/112, 124, 422, 592

[56] References Cited

U.S. PATENT DOCUMENTS

| | | | |
|---|---|---|---|
| 2,108,661 | 2/1938 | Farrier | 99/277.1 |
| 2,114,099 | 4/1938 | Ramsay | 99/277.1 |
| 2,203,229 | 6/1940 | Nilsson | 99/277.1 |
| 3,942,423 | 3/1976 | Herzfeld | 426/124 |
| 4,509,653 | 4/1985 | Corbett | 426/124 |
| 4,517,884 | 5/1985 | Sandrich | 99/276 |
| 4,821,630 | 4/1989 | Roberts | 426/112 |

Primary Examiner—Robert Jenkins
Attorney, Agent, or Firm—Larry D. Johnson

[57] ABSTRACT

An infusion tube for use with standard wine barrels to impart oak characteristics to a wine. A quantity of small oak cubes are placed inside a section of perforated tube and the ends of the tube are sealed. The perforated tube is then inserted through the bung hole of the wine barrel, and the bung hole sealed with a bung member. This enables the winemaker to periodically replace the wood cubes by removing the infusion tube through the bung hole, replacing the wood cubes, and re-inserting the infusion tube back into the wine barrel.

8 Claims, 1 Drawing Sheet

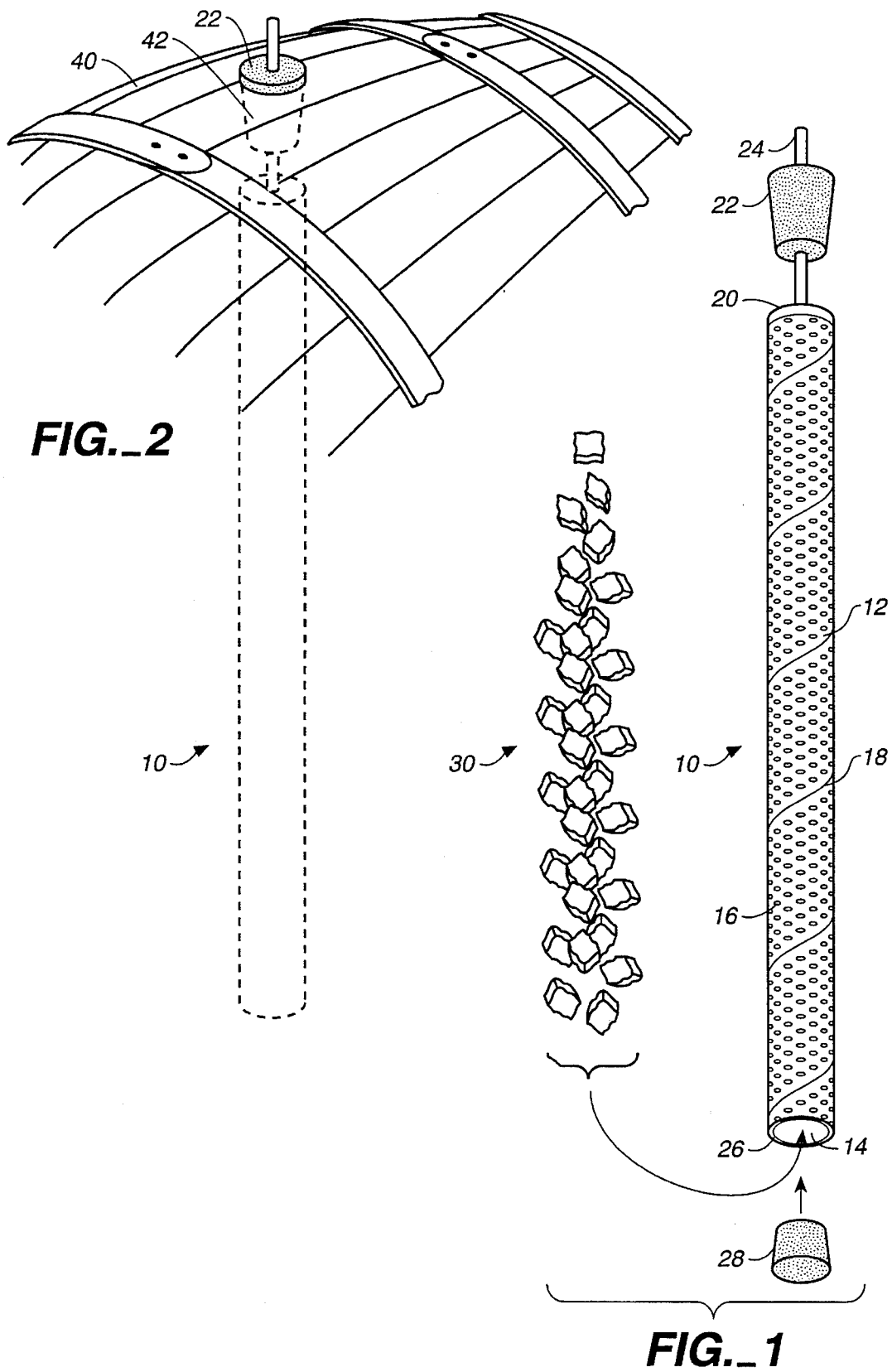
FIG._2
FIG._1

INFUSION TUBE FOR WINE BARRELS

BACKGROUND OF THE INVENTION

1. Field of the Invention

This invention relates generally to winemaking processes and equipment, and more specifically to an improved infusion tube apparatus for use with standard wine barrels to impart oak characteristics to a wine.

2. Description of the Prior Art

Wine barrels are well known, and are typically constructed of oak or similar wood material, which assists in the aging of the wine and imparts a desirable flavoring characteristic to the wine. Unfortunately, wooden barrels are expensive and difficult to maintain, and may only be used for a limited period of time before they must be replaced.

The use of stainless steel barrels solves many of these problems, but by their very nature these metal barrels do not yield the desirable wood characteristics to the wine. Some devices have been developed in an effort to address this problem. For example, Sullivan U.S. Pat. No. 5,174,461 discloses an apparatus that enables placement of wood slats inside a stainless steel or other wine barrel to impart the desired oak characteristics to the wine. However, such devices are preferably used with stainless steel barrels, and it would also be desirable to enhance and extend the use of existing, traditional wooden wine barrels.

SUMMARY OF THE INVENTION

The infusion tube for wine barrels of this invention provides an improved apparatus for use with standard wine barrels to impart oak characteristics to a wine. A quantity of small oak cubes or chips are placed inside a section of perforated tube and the ends of the tube are sealed. The perforated tube is then inserted through the bung hole of the wine barrel, and the bung hole sealed with a bung member. This enables the winemaker to periodically replace the wood cubes or chips by simply removing the infusion tube through the bung hole, replacing the wood cubes or chips, and re-inserting the infusion tube back into the wine barrel.

The inventive infusion tube is designed to fit into traditional French Burgundy, Bordeaux or Powcheon size export-style wine barrels through the bung hole of the barrel. The infusion tube is of a size to fit through the bung hole and within the wine barrel so that the bottom end of the infusion tube seats on the opposite side of the barrel, and the top of the infusion tube is secured adjacent the wine barrel bung with a height-adjustable bung member carried on a vertical support. The infusion tube is thus preferably of a diameter or width somewhat less than the diameter of the wine barrel bung hole (e.g., 1 11/16 inches diameter), and of a length approximately equal to the inside diameter of the barrel bilge (e.g., approximately 24 inches long). The infusion tube is preferably made of perforated tubing (e.g., 14-gauge #304 stainless steel, plastic or similar material). The bung and stopper members on each end of the infusion tube are preferably made of silicone, wood (e.g., oak or redwood), neoprene or other inert material.

Advantages to the inventive infusion tube apparatus include:

1. The apparatus may be used to ferment and/or age wine in older, neutral barrels. Loaded with toasted French oak cubes, the apparatus will give a full 30–100% extraction level of a new French oak barrel in approximately six to eight weeks. If more oak flavor is desired, the winemaker may simply pull the infusion tube out of the barrel, empty the tube, and add more toasted French oak cubes.
2. The apparatus prolongs the use of older cooperage. The infusion tube creates a hassle-free and sanitary alternative for winemakers who don't want to pull the heads off existing wine barrels to insert new French oak staves to rejuvenate the barrels.
3. The infusion tube is ideal for "tuning up" a wine with a high-quality French oak flavor just prior to bottling the wine.
4. Winemakers may choose the desired toast level of the pre-toasted French oak cubes.

BRIEF DESCRIPTION OF THE DRAWINGS

FIG. 1 is an exploded perspective view of an infusion tube for wine barrels of this invention, illustrating the component parts including a section of tube having a central cavity and a plurality of perforations disposed about its surface, and having a first sealed end adapted for releasable securing adjacent a wine barrel bung by a bung member slidably engaged on a central post, and a second open end adapted for releasable sealing by a stopper member, with a quantity of pre-toasted cubes of French oak or similar flavor-imparting material for placement within the tubing central cavity; and FIG. 2 is cutaway perspective view of the infusion tube of this invention (illustrated in phantom) installed into a typical wine barrel so that the bung member is captured by and seals the wine barrel bung hole, and at least some portion of the perforated tubing is submerged into the wine in the barrel.

DETAILED DESCRIPTION OF A PREFERRED EMBODIMENT

FIG. 1 is an exploded perspective view of an infusion tube 10 for wine barrels of this invention, illustrating the component parts including a section of tube 12 having a central cavity 14 and a plurality of perforations 16 disposed about its surface 18, and having a first sealed end 20 adapted for releasable securing adjacent a wine barrel bung by a bung member 22 slidably engaged on a central post or rod 24 connected to the sealed end 24, and a second open end 26 adapted for releasable sealing by a stopper member 28. The post or rod 24 may be a 3/8 inch stainless steel rod welded to the sealed end or cap 20, and slidably carries the bung member 22. This enables the entire infusion tube to be inserted into the wine barrel, so that the stopper member 28 rests on the opposite side (inside surface) of the barrel. The bung member 22 is then moved downwards on the rod 24 to seal the wine barrel bung hole. The rod 24 thus permits access to and removal of the infusion tube from the wine barrel when desired, and its extension through the bung hole prevents the infusion tube from inadvertently falling into the wine barrel.

A quantity of pre-toasted cubes 30 of French oak or similar flavor-imparting material are placed within the tubing central cavity 14. These wooden cubes or chips may be of any appropriate material, size, and degree of toasting. However, it has been found that French oak chips of a size of approximately three-quarter inch by three-quarter inch by three-eights inch provide desirable flavoring characteristics for many applications.

FIG. 2 is cutaway perspective view of the infusion tube 10 of this invention (illustrated in phantom) installed into a typical wine barrel 40 so that the bung member 22 is captured by and seals the wine barrel bung hole 42, and at least some portion of the perforated tubing 12 is submerged into the wine in the barrel. Thus, the bung member 22 effectively replaces the original wine barrel bung and removably seals the wine barrel to prevent oxidation of the wine. The bung member 22 can be installed and removed from the wine barrel bung hole in the normal manner.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. An infusion tube for wine barrels having a bung hole, said infusion tube comprising:

a section of tubing having a central cavity and a plurality of perforations disposed about its surface, and having a first sealed end adapted for releasable securing adjacent said wine barrel bung hole by a bung member carried on a rod, and a second open end adapted for releasable sealing by a stopper member; and a quantity of pre-toasted cubes of flavor-imparting material adapted to be placed within said tubing central cavity, wherein said infusion tube can be installed into a wine barrel so that said bung member is captured by and seals said wine barrel bung hole, and at least some portion of said perforated tubing is submerged into the wine in the barrel.

2. The infusion tube for wine barrels of claim 1 wherein said rod is of a length to extend through said wine barrel bung hole when said infusion tube is inserted into said wine barrel.

3. The infusion tube for wine barrels of claim 1 wherein said tubing is made of stainless steel.

4. The infusion tube for wine barrels of claim 1 wherein said bung member is made of silicone.

5. The infusion tube for wine barrels of claim 1 wherein said stopper member is made of silicone.

6. The infusion tube for wine barrels of claim 1 wherein said bung member is adapted to slide on said rod.

7. The infusion tube for wine barrels of claim 1 wherein said wine barrel has an inside diameter, and said section of tubing is of a length approximately equal to said wine barrel inside diameter.

8. The infusion tube for wine barrels of claim 1 wherein said wine barrel has an inside surface, and said stopper member is adapted to rest on said wine barrel inside surface when said infusion tube is inserted into said wine barrel.

* * * * *